C. L. BRINK.
WHEELWRIGHT MACHINE.
APPLICATION FILED MAY 21, 1910.

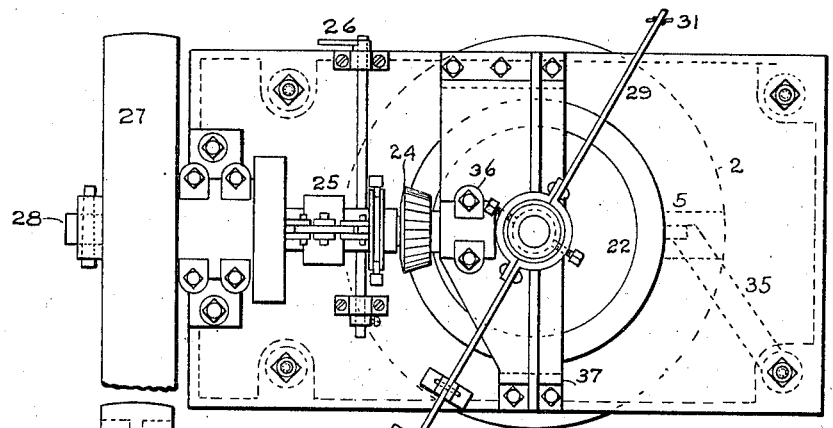
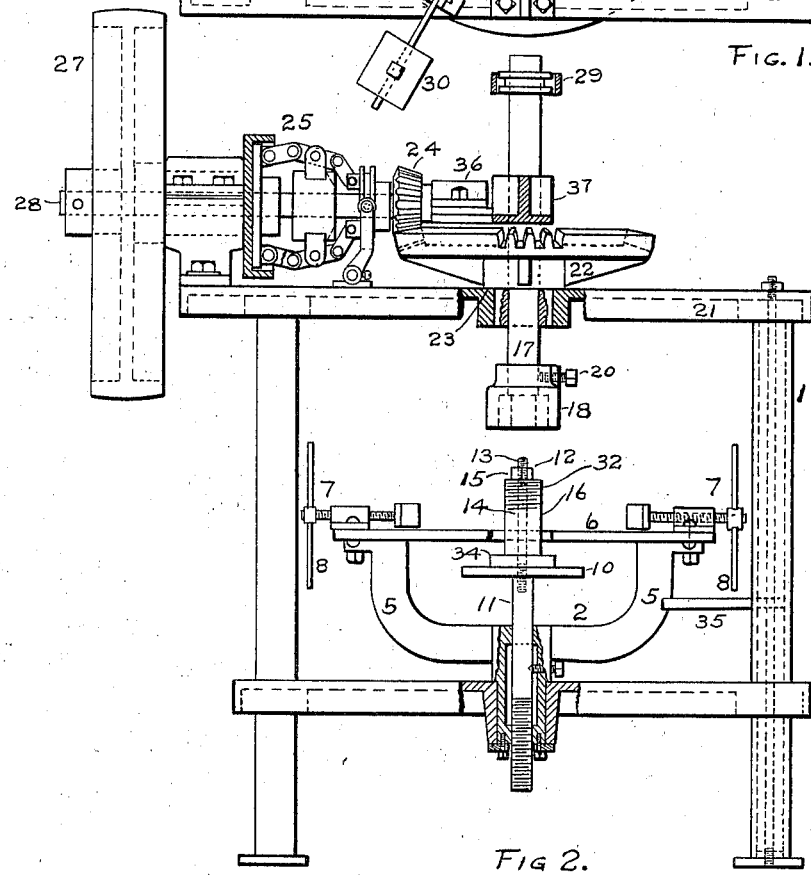

1,038,838.

Patented Sept. 17, 1912.

2 SHEETS—SHEET 2.

WITNESSES:
H. E. Smith.
Ruth Bartram.

INVENTOR.
Charles L. Brink
BY Clark C. Wood
ATTORNEY.

UNITED STATES PATENT OFFICE.

CHARLES L. BRINK, OF LANSING, MICHIGAN, ASSIGNOR TO W. K. PRUDDEN AND COMPANY, OF LANSING, MICHIGAN, A CORPORATION OF MICHIGAN.

WHEELWRIGHT-MACHINE.

1,038,838.  Specification of Letters Patent.  Patented Sept. 17, 1912.

Application filed May 21, 1910. Serial No. 562,756.

*To all whom it may concern:*

Be it known that I, CHARLES L. BRINK, a citizen of the United States, residing at Lansing, in the county of Ingham and State of Michigan, have invented certain new and useful Improvements in Wheelwright-Machines, of which the following is a specification.

My invention relates to power wrenches and while it may be used for many purposes it is more specifically designed for the purpose of facilitating the manufacture of wheels for automobiles and other road vehicles. In the manufacture of such wheels it is found desirable to temporarily fasten the spokes together by the use of what is known as a "dummy hub" which is composed of two parts adapted to screw together and my device is primarily designed for the purpose of screwing together the two parts of these dummy hubs after the spokes have been placed in position.

Figure 3:
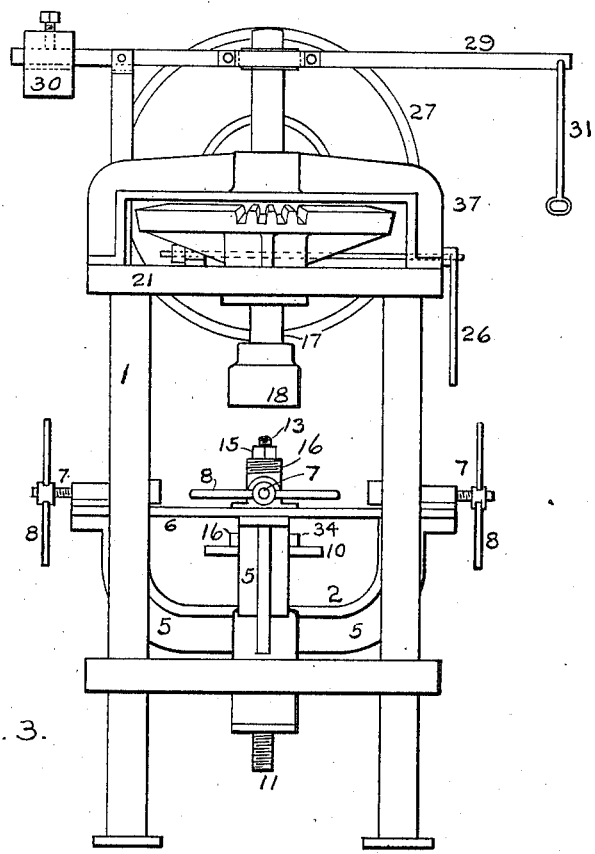
Figure 4:
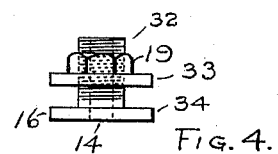

In the drawings, Figure 1 is a plan view of my device; Fig. 2 is an elevation from the front; Fig. 3 is an elevation taken from the end opposite the driving pulley, and Fig. 4 is an elevation of the dummy hub.

Referring more particularly to the drawings, 1 is the main frame of my device which may be of any desired construction adapted to support the working parts and may be adapted to either stand on the floor as shown in the drawings, or to be suspended from the ceiling. A wheel press 2, an elevation of which is shown in Fig. 2, is supported on the lower member 3 of the frame in a bearing 4, so that it can be readily revolved. The radial arms, 5, of this press are united by a ring 6, on which are mounted screws 7, equal in number to the spokes of the proposed wheel, each of said screws being provided with a handle 8 for operating it, and a socket, at the opposite end, formed to fit the end of the spoke. The hub support 10 is mounted on a screw shaft 11 substantially concentric with the wheel press so that the hub support may be raised or lowered by turning the screw 11. A mandrel 12 is fastened in the center of the upper end of the shaft 11 and is provided with a screw thread 13 on its upper extremity. The mandrel 12 is of such size as to pass readily through the central opening 14, in the dummy hubs, and a nut 15 screws on the thread 13 so as to hold the lower part 16 of the dummy hub firmly pressed against the hub support 10.

A revolving shaft 17 carries at its lower extremity a wrench 18, adapted to fit a nut 19 on the second half of the dummy hub. This wrench is firmly secured to the shaft 17 by a set screw 20 or in any other suitable manner so as to be removed when desired. The shaft 17 passes slidably through the upper member 21 of the frame 1 and also through a main gear 22 to which it is splined or otherwise connected, so as to revolve with the said gear, but at the same time to be readily raised and lowered. The gear 22 is supported on a bearing 23 formed on the upper surface of the frame and is driven by a pinion 24, actuated by the pulley 27 and shaft 28 through a friction clutch 25, which may be of any desired construction and is operated by a lever 26, in the usual manner. The shaft 17 is raised and lowered by a lever 29 which lever carries a counter weight 30 which is heavy enough to overbalance the weight of the shaft and lever so that normally the shaft will be held raised to its highest point, but may be drawn down by pulling on the handle 31.

The operation of my device is as follows: The lower half 16 of the dummy hub is first placed in position on the hub support 10 and secured there by screwing down the nut 15. The spokes are then placed in position and pressed firmly together by the screws 7. It is evident, however, that instead of the screws 7, many other well known means of pressing spokes into position, either separately or simultaneously, might be employed without departing from my invention. The spokes having been placed in position, the upper half of the nut 19 of the dummy hub is screwed on the thread 32 cut on the lower half 16 of the hub, the friction clutch is then brought into engagement by means of the handle 26, and the revolving shaft 17 is lowered by drawing on the handle 31 until the wrench 18 engages with the nut 19, when the nut will be screwed down until the spokes are firmly clasped between the flanges 33 and 34 of the dummy hub. The friction clutch 25 is so adjusted that it will slip when the nut 19 is screwed down sufficiently, and thus prevent the machine from being broken or the belt on the pulley 27 from slipping. A stop 35 is adapted to engage with the wheel press 2, so as to prevent it from revolving when the wrench is brought into action, and at the same time permit the wheel press to revolve so as to give more ready access to the screws 7 without requiring the operator to change his position. When the dummy hub is screwed as tightly as desired, the friction clutch 25 is released, which stops the revolution of the shaft 17 and releases the strain of the wrench 18 on the nut 19 so that the shaft 17, can be readily raised.

I claim,

In a machine for the purpose set forth, the combination of a main frame, a wheel press mounted on said frame for rotation horizontally, a hub support at the center of the press, means for clamping one member of an adjustable hub to the hub support and rigid with the rotatable press, means for holding and adjusting wheel spokes to a hub on the hub support, said means comprising a plurality of screw clamps mounted around the outer part of the press, each screw clamp being provided with a socket to receive the outer end of a spoke, a wrench mounted in the frame above the hub support, said wrench being adjustable to and from the support for turning a hub member, which has a screw threaded engagement with the hub member that is clamped to the hub support, to tightly clamp the wheel spokes between said hub members, a stop movable into engagement with the wheel press to prevent the wheel press from revolving when the wrench is operating on the adjustable hub member, and means for operating and adjusting the wrench.

In testimony whereof I affix my signature in the presence of two witnesses.

CHARLES L. BRINK.

Witnesses:
E. G. SCHULTZ,
RUTH I. BARTRAM.

---

Copies of this patent may be obtained for five cents each, by addressing the "Commissioner of Patents, Washington, D. C."